United States Patent [19]
Kishi

[11] Patent Number: 6,163,773
[45] Date of Patent: Dec. 19, 2000

[54] DATA STORAGE SYSTEM WITH TRAINED PREDICTIVE CACHE MANAGEMENT ENGINE

[75] Inventor: Gregory Tad Kishi, Oro Valley, Ariz.

[73] Assignee: International Business Machines Corporation, Armonk, N.Y.

[21] Appl. No.: 09/073,376

[22] Filed: May 5, 1998

[51] Int. Cl.[7] .................................................. G06F 15/18
[52] U.S. Cl. ............................... 706/16; 706/21; 706/25; 711/133; 711/134; 711/136
[58] Field of Search ................... 706/15, 16, 20, 706/21, 25; 711/133, 134, 136

[56] References Cited

U.S. PATENT DOCUMENTS

| | | | |
|---|---|---|---|
| 5,285,527 | 2/1994 | Crick et al. | 711/118 |
| 5,305,389 | 4/1994 | Palmer | 382/305 |
| 5,408,586 | 4/1995 | Skeirik | 706/25 |
| 5,566,315 | 10/1996 | Mililo et al. | 711/113 |
| 5,627,994 | 5/1997 | Levy et al. | 711/150 |
| 5,727,129 | 3/1998 | Barrett et al. | 706/10 |
| 5,754,939 | 5/1998 | Herz et al. | 455/4.2 |

OTHER PUBLICATIONS

P. Stigall et al., "A Neural Network Cache Controller," Intelligent Engineering Systems through Neural Networks, ASME Press, pp. 561–566, 1991.

M. F. Sakr et al., "Performance of On–Line Learning Methods in Predicting Multiprocessor Memory Access Patterns," Technical Report UMIACS–TR–96–59 and CS–TR–3676, Institue for Advanced Computer Studies, University of Maryland, 1996, pp. 1–22.

H. Khalid et al., "Performance Evaluation of a New Cache Replacement Scheme Using SPEC," Conference Proceedings of the 1996 IEEE Fifteenth Annual International Pheonix Conference on Computers and Communication, 1996, pp. 144–150, Mar. 1996.

O. Hammami, "Pipeline Integration of Neuro and Fuzzy Cache Management Techniques," Proceedings of the Sixth IEEE International Conference on Fuzzy Systems, 1997, vol. 2, pp. 653–658, Jul. 1997.

O. Hammami, "Towards Self Organizing Cache Memories Using Neural Networks," IEEE International Conference on Neural Networks, 1995, vol. 2, pp. 917–922, Dec. 1995.

*Primary Examiner*—Tariq R. Hafiz
*Assistant Examiner*—Jason W. Rhodes
*Attorney, Agent, or Firm*—Dan Hubert & Assoc.

[57] ABSTRACT

In a data storage system, a cache is managed by a predictive cache management engine that evaluates cache contents and purges entries unlikely to receive sufficient future cache hits. The engine includes a single output back propagation neural network that is trained in response to various event triggers. Accesses to stored datasets are logged in a data access log; conversely, log entries are removed according to a predefined expiration criteria. In response to access of a cached dataset or expiration of its log entry, the cache management engine prepares training data. This is achieved by determining characteristics of the dataset at various past times between the time of the access/expiration and a time of last access, and providing these characteristics and the times of access as input to train the neural network. As another part of training, the cache management engine provides the neural network with output representing the expiration or access of the dataset. According to a predefined schedule, the cache management engine operates the trained neural network to generate scores for cached datasets, these scores ranking the datasets relative to each other. According to this or a different schedule, the cache management engine reviews the scores, identifies one or more datasets with the least scores, and purges the identified datasets from the cache.

37 Claims, 6 Drawing Sheets

DATA STORAGE SYSTEM WITH TRAINED PREDICTIVE CACHE MANAGEMENT ENGINE

BACKGROUND OF THE INVENTION

1. Field of the Invention

The present invention relates to data storage systems having a cache for frequently used data. More particularly, the invention concerns a data storage system with a cache managed by a cache management engine that predictively evaluates the cache contents and purges entries unlikely to receive sufficient cache hits in the future. The engine includes a single output back propagation neural network that is trained in response to various event triggers, where training uses input comprising various characteristics of stored data, and a single output comprising data status at the time of the event trigger.

2. Description of the Related Art

As a result of the modern "information" era, people are faced with a tremendous amount of data to store, exchange, and process. The rate of data exchange has increased even further with the widespread use of the public Internet. With so much information, users find some type of data storage to be essential. In selecting or designing a data storage system, customers typically consider cost along with performance. Unfortunately, cost is inversely proportional to most performance characteristics, such as storage speed and storage size. Namely, storage devices with more speed and storage capability are usually more expensive.

Consequently, data storage customers typically purchase storage systems that balance cost and performance. One way to balance cost and performance is to use a variety of different storage devices, each suited to a different purpose. For example, an efficient storage system may include relatively slow, large, and inexpensive magnetic tape cartridge for archive data, while using faster, smaller, and more costly magnetic disk drives for more frequently used data. Use of this type of storage system is most efficient when data is purposefully allocated among the storage devices according to a plan. This plan may be implemented manually by the user, or automatically by the system itself.

One type of automatic data management system is called "caching," in which the storage system places frequently or recently used data in the fastest (but most expensive) storage devices. The high performance storage device filled with frequently or recently used data is the "cache." In many cases, the cache comprises an especially fast, high performance storage component such as random access memory ("RAM").

One of the challenges in operating a cache is cache management. Namely, some strategy is required for determining when data should be cached, and when not. In many cases, a copy of a dataset is placed in cache any time that dataset is read or written to the storage system. Thus, the cached dataset is more quickly accessible next time it is needed. Eventually, the cache is evaluated and purged of all cache entries not meeting certain prerequisites. One popular approach for cache purging is the "least recently used" criteria, called "LRU." With LRU, the cache is purged of the oldest entries. Another popular approach is the "least frequently used" criteria, called "LFU." With LFU, cache purging deletes entries that are accessed least often, irrespective of their recency of use.

Although these approaches enjoy widespread use today, International Business Machines Corp. ("IBM") has continually sought to improve the performance and efficiency of their storage systems including the cache management subcomponents. In studying known cache management approaches, the present inventor has recognized that they may not be completely satisfactory in some applications. For example, under the LRU approach, the contents of a daily backup operation are likely to remain in cache continuously because of the daily access to that data. However, backup operations are frequently performed without ever accessing the data again; data access only occurs in the event of a data loss or corruption, which rarely occur. Thus, it is inefficient to store backup data in cache because this data occupies cache space that may otherwise be filled with data that is likely to be used again, and thus benefit from the fast-access nature of the cache. Due to this caching scheme, the displaced data is stored in other available storage devices, which are slower than the cache. Ultimately, users are delayed when they initiate read or write operations involving this displaced data, since it is not cached. At the same time, the daily backup data resides in cache, ready for fast access in response to user requests that virtually never occur.

Consequently, known cache management strategies are not completely adequate for some applications due to certain unsolved problems.

SUMMARY OF THE INVENTION

Broadly, the present invention concerns a data storage system with a cache managed by a cache management engine that predictively evaluates the cache contents and purges entries unlikely to receive sufficient cache hits in the future. The engine includes a single output back propagation neural network that is trained in response to various event triggers, where training uses input comprising various characteristics of stored data, and a single output comprising data status at the time of the event trigger.

According to the invention, cache management is performed in a data storage system including a cache management engine coupled to a storage, a dataset access log, and a cache. The cache management engine includes a single output back propagation neural network, which is trained and used as discussed below. The data access log stores information representing a dataset whenever that dataset is accessed by the user. Contents of the data access log expire according to a predefined expiration criteria, such as a certain age. The cache stores datasets according to a predefined use-based criteria, such as every time a dataset is accessed by the user. Cache contents are evaluated by the trained neural network, and groomed accordingly.

More specifically, in response to an event "trigger", such as access of a dataset or expiration of its access log record, the cache management engine prepares training data concerning that dataset. This is achieved by determining past characteristics of the dataset as of various times between the event trigger and the dataset's previous access, and providing the past characteristics as input to train the neural network. In training the network, the cache management engine provides the neural network with output representing the expired or accessed status of the dataset as of the last event trigger.

According to a predefined schedule, the cache management engine operates the trained neural network to generate scores for cached datasets, these scores ranking the cached datasets relative to each other. According to this or a different schedule, the cache management engine reviews the scores, identifies one or more datasets with the lowest scores, and purges the identified datasets from the cache.

Accordingly, one embodiment of the invention may be implemented to provide a method, such as a method of operating a predictive cache management engine to evaluate cache contents and purge entries unlikely to receive sufficient cache hits in the future. In another embodiment, the invention may be implemented to provide an apparatus, such as a data storage system including a cache management engine programmed to evaluate cache contents and purge entries unlikely to receive sufficient cache hits in the future. In still another embodiment, the invention may be implemented to provide a signal-bearing medium tangibly embodying a program of machine-readable instructions executable by a digital data processing apparatus to perform a method of operating a predictive cache management engine to evaluate cache contents and purge entries unlikely to receive sufficient cache hits in the future.

The invention affords its users with a number of distinct advantages. In contrast to past cache management strategies such as LRU and LFU, the invention performs more efficient cache management. As a result of specialized neural network training, datasets remaining in cache are those with the highest likelihood of receiving future cache hits. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a data storage system with a cache managed by a predictive cache management engine that evaluates the cache contents and purges entries unlikely to receive sufficient cache hits in the future. The engine includes a single output back propagation neural network that is trained in response to various event triggers, where training uses input comprising various characteristics of data, and output comprising data status at the time of the event trigger.

HARDWARE COMPONENTS & INTERCONNECTIONS

Data Storage System

Introduction

Figure 1:
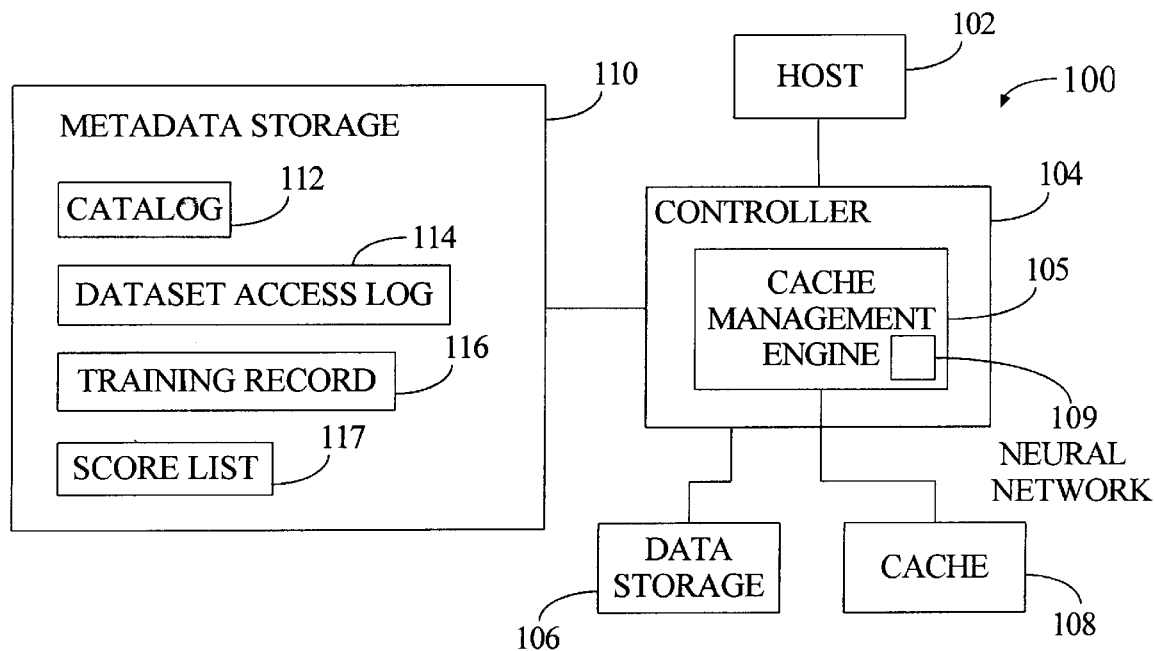
FIG. 1 is a block diagram of the hardware components and interconnections of a data storage system in accordance with the invention.

One aspect of the invention concerns a data storage system, which may be embodied by various hardware components and interconnections, as exemplified by the data storage system 100 of FIG. 1. The system 100 includes a host 102, controller 104, data storage 106, cache 108, and metadata storage 110. Generally, the host 102 issues read and write commands to the controller 104 to read and write data from/to the data storage 106. Under control of a cache management engine 105 of the controller 104, the cache 108 stores copies of certain data that the host 102 reads or writes from/to the data storage 106. In contrast to the data storage 106, the metadata storage 110 contains various information about data stored in the data storage 106 and cache 108. This information is known as "metadata."

Host and Controller

The host 102 may be implemented by one or more personal computers, computer workstations, supercomputers, mainframe computers, servers, or other digital data processing machines adequate to issue read/write commands to the controller 104. To provide a specific example, the host 102 may comprise a server such as an IBM brand ES/9000 model machine. Like the host 102, the controller 104 may be implemented by a variety of digital data processing machines, such as one or more personal computers, servers, mainframe computers, or other digital data processing machines adequate to receive and execute read/write commands from the controller 104 and manage the data storage 106 and cache 108. As a specific example, the controller 104 may comprise a storage controller as is present in the IBM brand Virtual Tape Server model data storage subsystem.

Cache Management Engine

The cache management engine 105 manages the contents of the cache 108, including introduction of data into the cache ("staging"), grooming the cache 108 by evaluating its contents and purging stale data, and destaging cached data to the storage 106. As an example, the engine 105 may employ data processing capability that is distinct from the controller 104. In this respect, the engine 105 may comprise a digital data processing apparatus in addition to that of the controller 104. As an alternative, the engine 105 may be implemented by using hardware of the controller 104, where the engine 105 is provided by separate threads, subroutines, tasks, or other software processes of the controller 104. This embodiment is appropriate when the controller 104 includes sufficient processing power to perform the functions of the engine 105 discussed below. An example of one sufficiently powerful controller is an IBM RS/6000 type machine, with an operating system such as AIX or UNIX.

The cache management engine 105 includes a single output back propagation neural network 109. As discussed below, this neural network 109 is trained to rank cached datasets relative to each other, based upon their past activity in the cache 108. The network 109 includes multiple input nodes, multiple intermediate nodes, and a single output node. Each node has associated coefficients, which are used to multiply inputs received by that node. The number of nodes and number of intermediate levels may be determined according to known models, using empirical techniques, or by another technique. The coefficients are determined by "training" the network 109, a process that is described in greater detail below. When the trained neural network 109 receives input data including various characteristics of a dataset, it responds by providing a single output comprising a numeric "score" evaluating the desirability of retaining that dataset in the cache 108. Although further details of single output back propagation neural networks are not needed, because the construction and use of such networks are thoroughly known to those of ordinarily skill in the relevant art, an illustrative construction of the neural network 109 is set forth in Appendix A, which contains a sequence of "C" language source code.

Data Storage

The data storage 106 is the chief location where user data is stored in the system 100. Although the data storage 106 may be implemented by any digital data storage medium, the data storage 106 advantageously comprise an inexpensive, non-volatile storage such as magnetic or optical disk drives, magnetic or optical tapes, and the like. To provide a specific example, an IBM model 3590 tape drive may be used. The data storage 106 may be coupled to the controller 104 by any suitable digital data link, such as wires, cables, fiber optic lines, telephone lines, wireless, etc.

Cache

The cache 108 houses datasets that are accessed more heavily. Implemented in fast-access but more expensive data storage, the cache 108 provides the system 100 with improved read/write time for heavily used datasets. Although the cache 108 may be implemented in a any digital data storage medium, a specific example includes a RAID-5 magnetic disk drive system such as the IBM model 7133 product. As an alternative to the illustrated example, the cache 108 may be interposed between the data storage 106 and controller 104. The cache 108 may be coupled to the controller 104 by any suitable digital data link, such as wires, cables, fiber optic lines, telephone lines, wireless, etc.

Metadata Storage

In the illustrated example, data is stored in the data storage 106 and cache 108 in units called "datasets." A dataset may comprise a file, multiple files, record, track, or any other data structure suitable to the application at hand. Each read/write operation may access some or all of a dataset.

The metadata storage 110 includes various information about datasets stored in the data storage 106 and cache 108. As illustrated, this information is recorded in a catalog 112, dataset access log 114, training record 116, and score list 117. Although the metadata storage 110 is shown as a single unit for ease of illustration, the metadata storage 110 may be distributed among various locations such as the storage 106, controller 104, host 102, other locations (not shown), etc. The catalog 112 contains information identifying each dataset and its addresses in the cache 108 and/or data storage 106. The dataset access log 114 lists certain characteristics of each access to any dataset contained in the data storage 106 and/or the cache 108. Table 1 (below) shows an exemplary excerpt of the dataset access log 114, with some representative data characteristics.

TABLE 1

Dataset Access Log

| DATASET NAME | ACCESS TIME | ACCESS DAY | DATASET SIZE | DATA SIZE READ | DATA SIZE WRITTEN |
| --- | --- | --- | --- | --- | --- |
| dataset-1 | 12:01 | Sunday | 10 Mb | 10 Mb | 0 |
| dataset-2 | 12:05 | Monday | 5 Mb | 0 | 1 Mb |
| dataset-9 | 12:30 | Monday | 8 Mb | 0 | 1 Mb |
| dataset-1 | 12:31 | Saturday | 11 Mb | 0 | 1 Mb |

A number of other statistics may be beneficially stored in the data access log as well, as recognized by ordinarily skilled artisans having the benefit of this disclosure. For example, where the storage 108 includes a magnetic tape library, the log 114 may include information indicating whether a dataset corresponds to a "scratch" mount representing a newly acquired tape cartridge.

The training record 116 includes various data compiled by the cache management engine 105 about activity in the cache 108. The training record is used as input to train the cache management engine 105, enabling the engine 105 to predictively manage contents of the cache 108 to most efficiently satisfy anticipated cache hits. The contents and use of the training record are discussed in greater detail below.

The score list 117 contains scores ranking cached datasets relative to each other, as calculated by application of the trained cache management engine 105 and discussed below.

Exemplary Digital Data Processing Apparatus

In contrast to the data storage system 100, another aspect of the invention concerns a digital data processing apparatus, which may be programmed to perform various cache related activities, such as training the cache management engine 105, managing the cache 108, etc. This apparatus may be embodied by various hardware components and interconnections, which may serve as the controller 104 and/or cache management engine 105.

Figure 2:
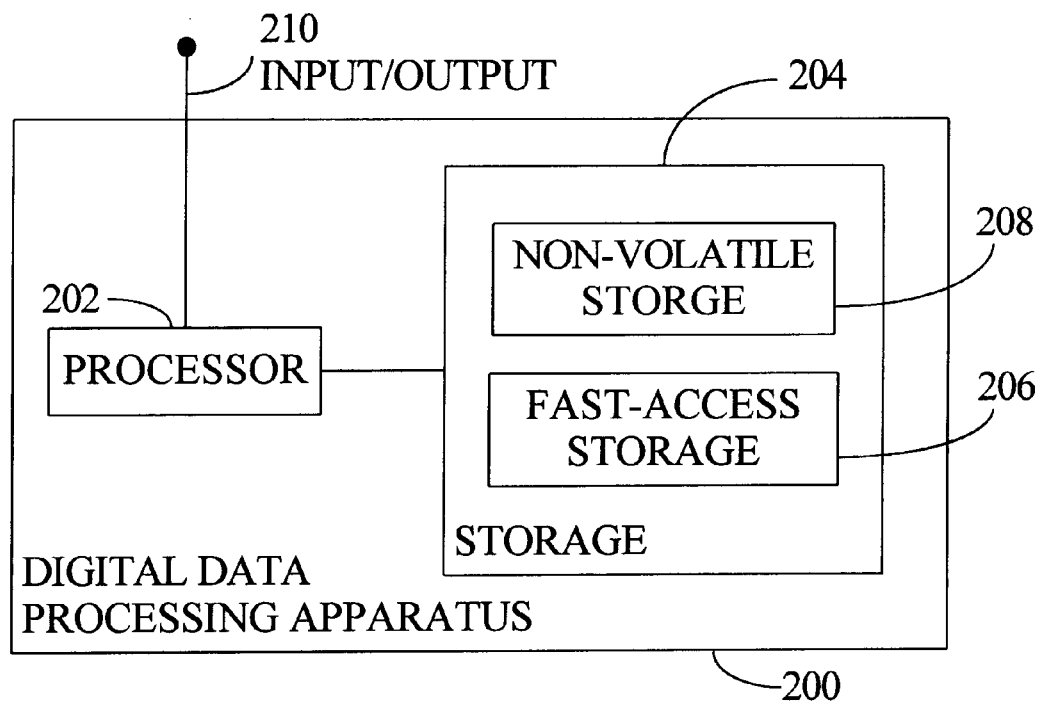
FIG. 2 is a block diagram of a digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for managing a cache with a predictive cache management engine that evaluates the cache contents and purges entries unlikely to receive sufficient cache hits in the future. A separate method aspect of the invention is a process for training a single output back propagation neural network in response to various event triggers, where training uses input comprising various characteristics of stored data, and output comprising data status at the time of the event trigger.

Signal-Bearing Media

In the context of FIG. 1, such a method may be implemented, for example, by operating the cache management engine 105 (embodied by the digital data processing apparatus 200) to execute one or more corresponding sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform certain methods. One example is a method to manage a cache with a predictive cache management engine that evaluates the cache contents and purges entries unlikely to receive sufficient cache hits in the future. Another example is a method for training a single output back propagation neural network in response to various event triggers, where training uses input comprising various characteristics of cache data, and output comprising data status as of the event trigger.

Figure 3:
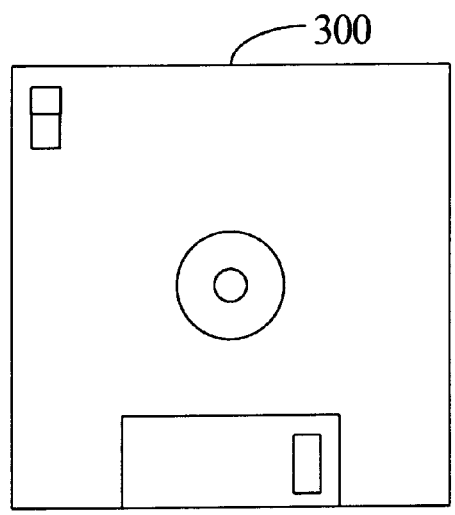
FIG. 3 shows an exemplary signal-bearing medium in accordance with the invention.

As an example, the foregoing signal-bearing media may comprise RAM (not shown) contained within the controller 104 (FIG. 1), as represented by the fast-access storage 206 (FIG. 2). Alternatively, the instructions may be contained in another signal-bearing media, such as a magnetic data storage diskette 300 (FIG. 3), directly or indirectly accessible by the processor 202. Whether contained in the fast-access storage 206, diskette 300, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C++, etc.

Generating Training Data: Generally

Figure 4:
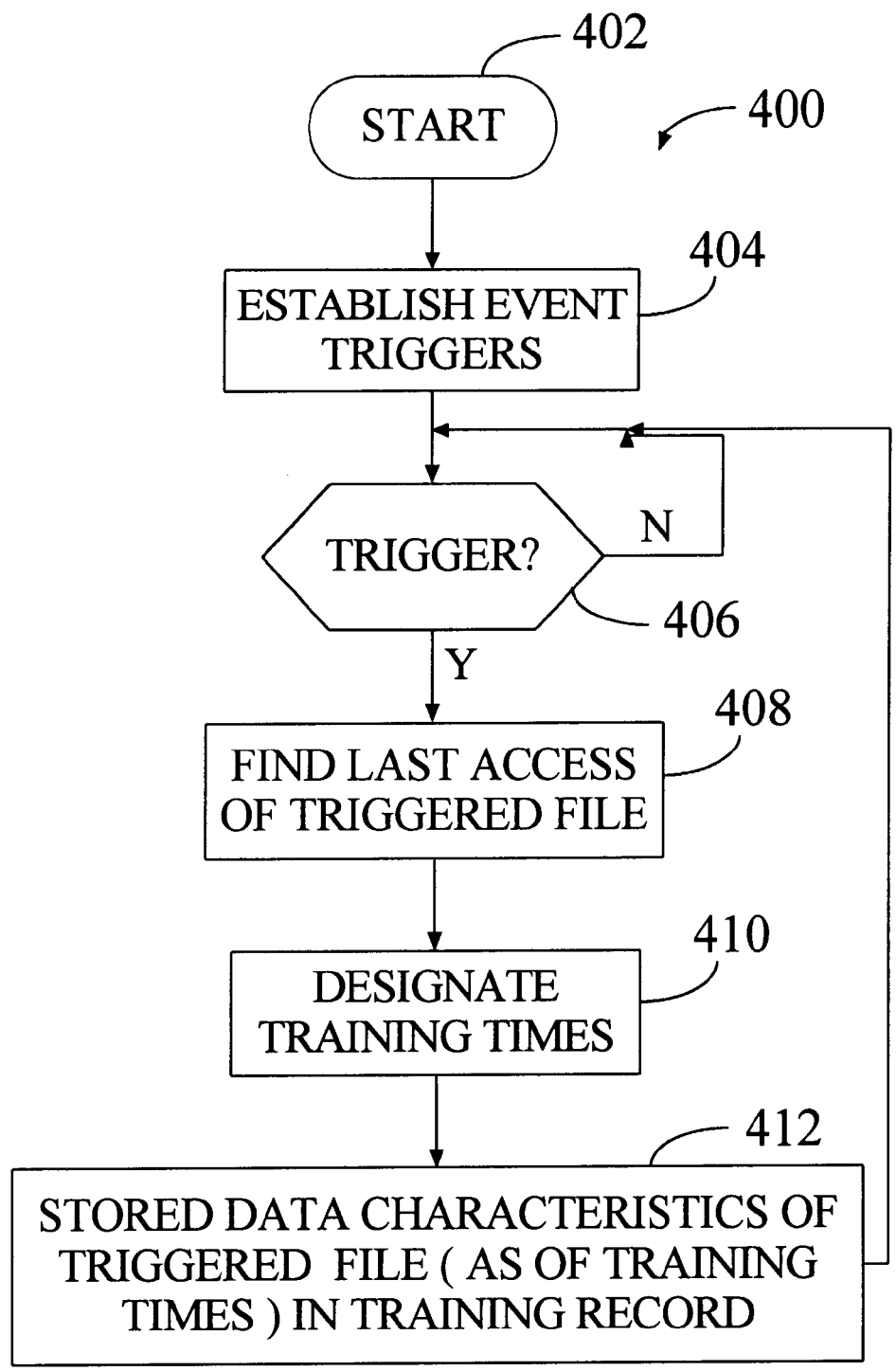
FIG. 4 is a operational sequence for gathering training data in accordance with the invention.

FIG. 4 shows a sequence 400 of steps to illustrate one technique for generating training data for the single output back propagation neural network of the invention. For ease of explanation, but without any limitation intended thereby, the example of FIG. 4 is described in the context of the data storage system 100 described above. In this example, the sequence 400 is executed by the cache management engine 105.

After the sequence 400 is initiated in step 402, step 404 establishes various "event triggers." Each event trigger represents a different event, which can occur to any dataset in the system 100. As discussed below, the occurrence of an event trigger activates the cache management engine 105 to compile and store various training data. As one example, the event triggers established in step 404 may include (1) access of a cached dataset by the controller 104, thereby corresponding to a new entry in the dataset access log 114, and (2) expiration and removal of a dataset from the dataset access log 114. The event triggers are selected by a user, such as an operator, system administrator, programmer of the engine 105, etc. The triggers may be established in step 404 by storing data representing the triggers in a location accessible to the engine 105, programming the engine 105 to recognize the triggers, or another technique.

Figure 5:
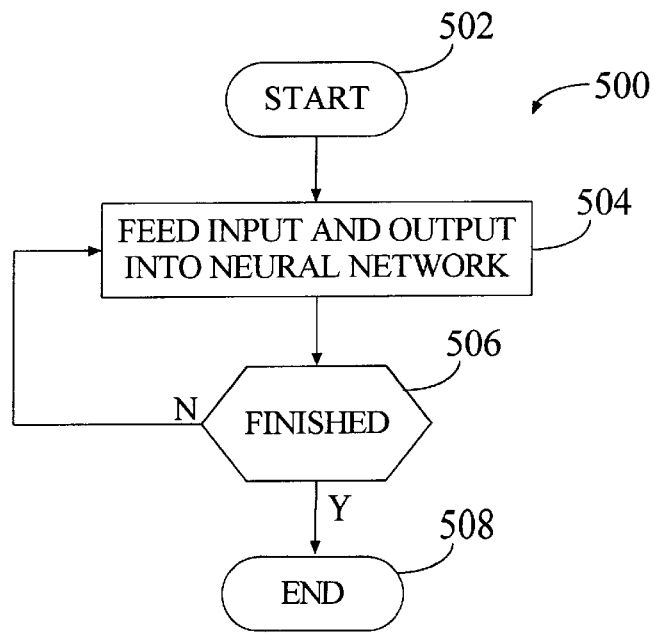
FIG. 5 is a operational sequence for neural network training in accordance with the invention.

Once the triggers have been established, the engine 105 in step 406 determines whether a trigger has occurred in conjunction with a dataset in the dataset access log 114. When a trigger occurs, the engine 105 consults the dataset access log (step 408) to determine when the affected dataset was last accessed prior to the event trigger. This information is used in step 410, where the engine 105 designates training times. Each training time is used to identify a set of corresponding data characteristics of the triggered dataset, as of that time. The training times are important because they identify past data characteristics that are later fed as input to the cache management engine's neural network 109, as shown in FIG. 5 and discussed in greater detail below. In summary, the neural network 109 is fed with (1) input comprising various data characteristics existing at some past time, along with (2) output comprising the dataset's status as of the event trigger, e.g., access of the dataset or expiration of its record in the dataset access log 114. This input and output provides the basis for training the neural network 109.

Generally, the training times include the trigger time along with the time the triggered dataset was last accessed, and may also include one or more intermediate times. The training times may be selected under a variety of different approaches, such as designating evenly distributed times between the time of the trigger and the time of last access, along with the trigger time and last access times. One example of even distribution is training times occurring hourly. Continuing this example, if the time of last access was 00:00, the trigger time was 06:00, training times would be established at 00:00, 01:00, 02:00, 03:00, 04:00, 05:00, and 06:00.

After designating the training times, step 412 determines various characteristics of the triggered dataset existing at the designated training times, and stores these characteristics in the training record 116. In the illustrated hardware environment, step 412 is performed by the engine 105. These data characteristics concern various features of the triggered dataset at the corresponding training time. As a particular example, the data characteristics stored in the training record 116 may include some or all of the information in the dataset access log 114 for the triggered dataset, an output value representing the status of the dataset as of the event trigger (e.g., expired or accessed), and the age of the dataset in cache at the corresponding training time. Ordinarily skilled artisans will recognize a number of other data characteristics that may be stored in the training record 116 in addition to (or instead of) the foregoing, such as the type of data, or any other characteristics of the dataset itself or its past use. Table 2 (below) shows an example of a training record where the time of last access was 00:00, the trigger time was 06:00, and training times were established at 00:00, 01:00, 02:00, 03:00, 04:00, 05:00, and 06:00.

provides the input and output values to the neural network 109 according to the training record 116, and initiates training. The engine 105 checks for completion of training in step 506. Steps 504–506 repeat until training is completed.

A number of different criteria may be used to determine when training is complete. As one specific example, this criteria may require a root mean square ("RMS") error less than a certain value, such as 0.1%. RMS is a known error measurement technique that takes the square root of the sums of the square of all errors, and divides this square root by the number of entries. Numerous other completion standards may also be used, as will be apparent to ordinarily skilled artisans having the benefit of this disclosure. After training is complete, the sequence 500 ends in step 508.

Evaluating and Grooming Cache

Figure 6:
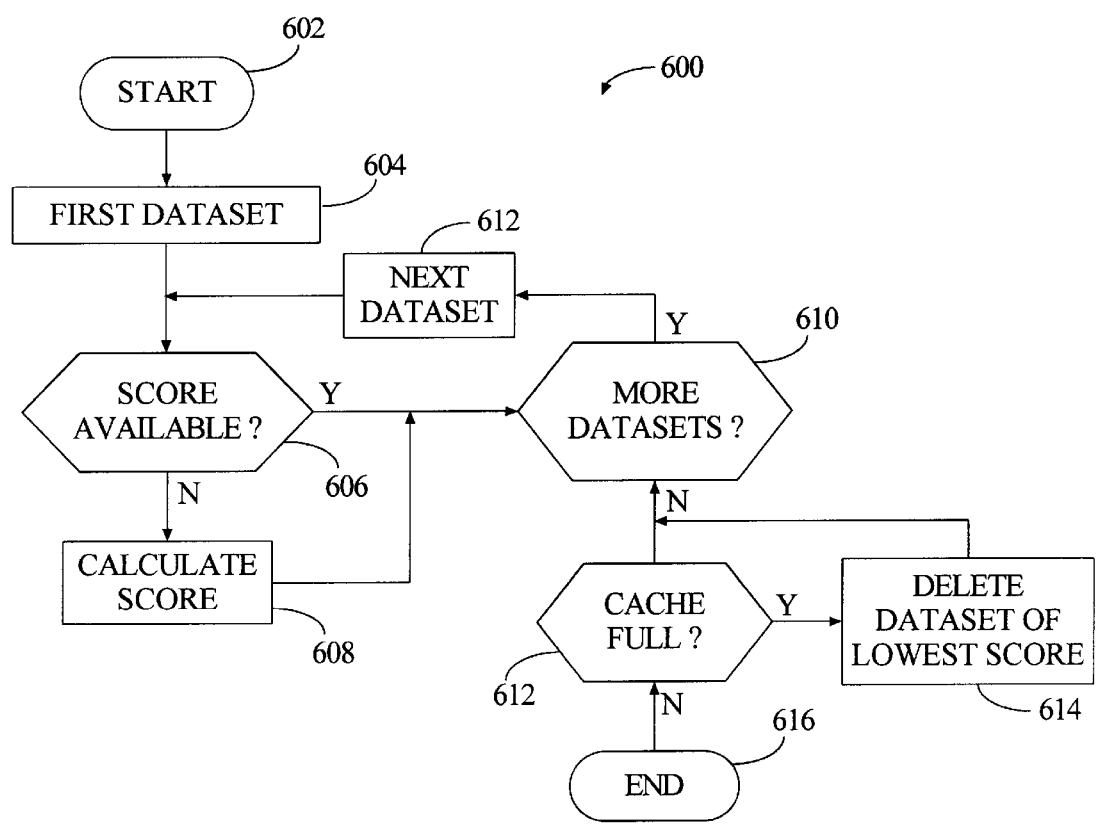
FIG. 6 is a operational sequence for cache grooming in accordance with the invention.

Having entered some data in the training record 116 and used this information to train the neural network 109 at least once, the cache management engine 105 is available for use in evaluating and grooming the cache 108. FIG. 6 shows a sequence 600 of steps to illustrate one example of cache evaluation and grooming according to the present invention. For ease of explanation, but without any limitation intended thereby, the example of FIG. 6 is described in the context of the data storage system 100 described above.

The sequence 600, which begins in step 602, may be started under various circumstances. For example, the sequence 600 may be initiated periodically, according to a

TABLE 2

Training Record

| INPUT: DATA CHARACTERISTICS | OUTPUT: DATASET STATUS AT EVENT TRIGGER | INPUT: AGE IN CACHE (HOURS) |
| --- | --- | --- |
| . . . (as of training time 00:00) | accessed | 0 |
| . . . (as of training time 01:00) | accessed | 1 |
| . . . (as of training time 02:00) | accessed | 2 |
| . . . (as of training time 03:00) | accessed | 3 |
| . . . (as of training time 04:00) | accessed | 4 |
| . . . (as of training time 05:00) | accessed | 5 |
| . . . (as of training time 06:00) | accessed | 6 |

Alternatively, some applications may find it helpful to normalize the values stored in the training record. In this embodiment, each item of data in the training record is normalized to a value between zero and one. After step 412, the routine 400 returns to step 406 to detect the next trigger.

Training

As mentioned above, information in the training record 116 is constructed to later train the neural network 109. Training of the network 109 may be performed as shown by the sequence 500 of FIG. 5, which provides one example. For ease of explanation, but without any limitation intended thereby, the example of FIG. 5 is described in the context of the data storage system 100 described above. In this example, the sequence 500 is executed by the cache management engine 105.

The sequence 500, which begins in step 502, may be initiated on any desired schedule. As an example, the training sequence 500 may begin periodically, according to some preplanned schedule, whenever information is added to the training table 116, or another useful schedule. After step 502, the cache management engine 105 in step 504 predefined non-periodic schedule, whenever cache occupancy exceeds a predefined threshold (such as 85%), etc. After step 602, the cache management engine 105 in step 604 considers a first one of the datasets residing in the cache 108. This dataset may be selected arbitrarily, or according to some ordered selection plan. The dataset of step 604 is "first" because it is evaluated first. As of step 604, the dataset of step 604 becomes the "current" dataset.

In step 606, the cache management engine 105 consults the score list 117 to determine whether the current dataset has been scored previously. As one option, step 606 may require the dataset score to be current, as evaluated by a time window or other currency criteria. If step 606 finds no score available, step 608 calculates a score for the current dataset. Step 608 is performed by providing the dataset's current data characteristics and the dataset's age in cache as input to the trained neural network 109. The network's output is the dataset's score.

After step 608 (or a positive answer to step 606), step 610 determines whether there are more cached datasets to score. If so, step 612 progresses to the next cached dataset, making this the "current" dataset, and then returns to step 606. In contrast, if step 610 finds that all cached datasets have been scored, the routine 600 advances to step 612.

In step 612, the cache management engine 105 determines whether the cache 108 is "full." Cache fullness may be defined using any helpful threshold or other criteria, such 85% data occupancy. If the cache 108 is "full", the engine 105 deletes the cached dataset with the lowest score, in step 614. As an alternative, step 614 may use another deletion criteria that considers additional factors. For example, step 614 may create an enhanced score by dividing each dataset's score by its size in cache, and delete the dataset with the lowest enhanced score. Steps 612 and 614 are repeated until the cache 108 is no longer "full," at which time the routine 600 ends in step 616.

Generating Training Data- More Detail

Introduction

Figure 7:
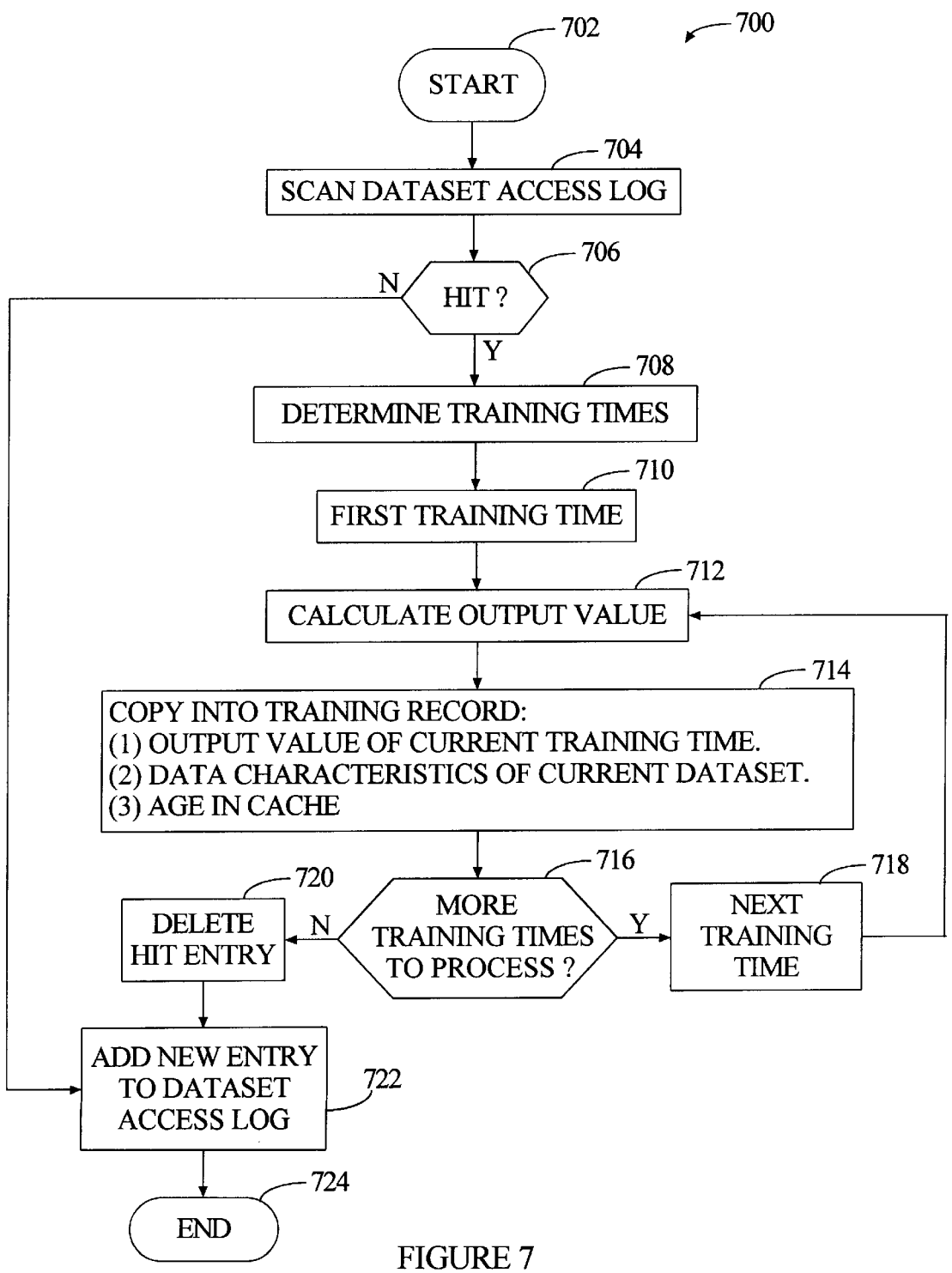
FIG. 7 is an operational sequence for gathering training data pertaining to reaccessed datasets in accordance with the invention.
Figure 8:
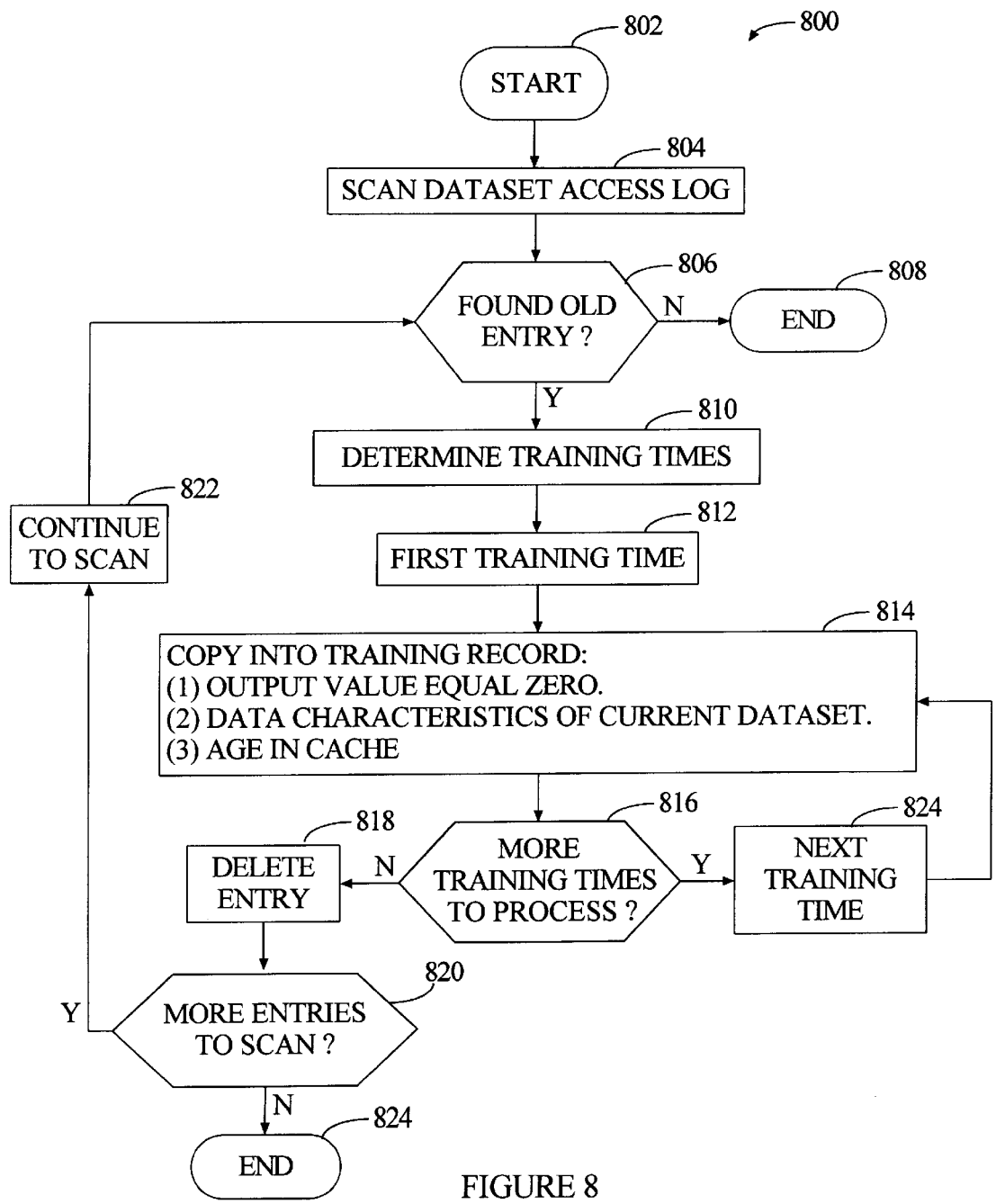
FIG. 8 is an operational sequence for gathering training data pertaining to expired datasets in accordance with the invention.

Discussed above, the sequence 400 (FIG. 4) generally illustrates a process for collecting data to train the neural network 109. Steps 406–412 of this process are described in greater detail below with the specific sequences 700 and 800 of FIGS. 7–8. In FIG. 7, a sequence 700 makes entries to the training record 116 in response to reaccess of cached datasets, this being one type of event trigger. In FIG. 8, a sequence 800 makes entries to the training record 116 in response to expiration of records in the dataset access log 1 14, the other type of event trigger.

Re-Accessed Data

More specifically, the sequence 700 begins in step 702. In this example, step 702 is performed for a dataset whenever the controller 104 accesses the dataset in the cache 108 or data storage 106. This dataset is the "current" dataset. The access causing step 702 to commence is an event trigger.

In step 704, the cache management engine 105 scans the dataset access log 114 for an entry corresponding to the current dataset. If none is found, the cache management engine 105 adds such an entry in step 722, and the routine 700 ends in step 724.

Otherwise, if the dataset access log 114 contains a past entry corresponding to the current dataset, the engine 105 in step 708 proceeds to designate training times, as discussed above. Having established the training times, the engine 105 considers data characteristics of the current dataset at a first one of the training times in step 710. In step 712, the engine 105 computes a neural network output value for the dataset. In this example, the output value comprises a normalized value, computed as shown below in Equation 1.

$$\text{output value} = (N-INTV)/N \qquad [1]$$

where: N=predetermined length of time at which records in the dataset access log 114 expire, as explained below.

INTV=the time between the current training time and the event trigger. After step 712, the engine 105 stores certain information in the training record 116 (step 714) for the current training time. In particular, the stored information includes (1) the output value of the dataset for the current training time, (2) data characteristics of the current dataset as of the current training time, and (3) the dataset's age in cache with respect to the time of last access, as of the current training time.

Following step 714, the engine 105 determines whether there are more training times to process (step 716). If so, step 718 proceeds to the next training time, and then returns to step 712, discussed above. Otherwise, after all training times have been processed, step 716 advances to step 720, in which the engine 05 deletes the entry in the dataset access log 114 corresponding to the current dataset. After step 720, the engine 105 in step 722 adds an updated entry to the dataset entry log, reflecting the dataset's condition as of the recent access. After step 722, the routine 700 ends in step 724.

Expired Data

In contrast to FIG. 7, the sequence 800 (FIG. 8) constructs training record entries in response to a different event trigger—expiration of records from the dataset access log 114. The routine 800 begins in step 802. In this example, step 802 is performed on according to a periodic or other appropriate schedule. In step 804, the cache management engine 105 scans the data access log 114 for datasets that have not been accessed recently. As shown below, this scan is performed not to groom the cache by purging old datasets from cache, but to use this aging information for training the neural network 109 and to groom the dataset access log 114.

In this example, the engine 105 in step 804 searches for dataset access log entries older than a prescribed age, such as one hundred hours. This age is represented by "N" in Equation [1], above. If no sufficiently old entries are found by step 806, the routine 800 ends in step 808. Otherwise, upon finding a sufficiently old entry, the engine 105 in step 810 proceeds to designate training times, as discussed above. Having established the training times, the engine 105 then considers data characteristics of the dataset at a first one of the training times (step 812). In step 814, the engine 105 stores certain information into the training record 116. In particular, the stored information includes (1) an output value of "zero" for the dataset at the current training time, since this dataset was never re-accessed in the cache 108, (2) data characteristics of the current dataset as of the current training time, and (3) the dataset's age in cache as of the current training time.

Following step 814, the engine 105 determines whether there are more training times to process (step 816). If so, step 824 proceeds to the next training time, and then returns to step 814, continuing as discussed above. Otherwise, after all training times have been processed, step 816 advances to step 818, in which the engine 105 deletes the entry in the dataset access log 114 corresponding to the current dataset. This constitutes "expiration" of the dataset access log entry. After step 818, the engine 105 in step 820 determines whether the entire dataset access log 114 has been scanned. If not, step 822 continues scanning and returns to step 806, discussed above. Otherwise, after the scanning of the dataset access log 114 is complete, the sequence 800 ends in step 824.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

---

APPENDIX A

---

```
double get_network_output(NINPUT *nptr)
{
int i, j, k;
    input_values[0] = nptr->dayofweek;
    input_values[1] = nptr->timeofday;
    input_values[2] = nptr->scratch;
    input_values[3] = nptr->read_MBytes;
    input_values[4] = nptr->write_Mbytes;
    input_values[5] = nptr->size;
    input_values[6] = nptr->cacheage;
    /* force unitary inputs to middle layer - required */
    input_values[INPUT_MAX] = 1.0;
    /* process middle layer (note input layer just fans out) */
    for (i = 0; i<MIDDLE_MAX; i++); {
        middle_values[i] = 0.0;
        /* handle all inputs including unitary input */
        for (j=0; j<=INPUT_MAX; j++) {
            middle_values[i] += middle_weights[i] [j]*input_values[j];
        } /* endfor */
        /* Store middle derivatives for later use in training;
        /* this prevents doing this loop again later */
        temp_double = 1.0 + exp(-middle_values[i]);
        middle_derivatives [i] = exp(-middle_values [i])/(temp_double*temp_double);
        /* Convert output using non-linear function 1/(1+exp(x)) */
        middle_values[i] = 1.0/temp_double;
    } /* endfor */
    /* force unitary inputs to outer layer - required */
    middle_values[MIDDLE_MAX] = 1.0;
    /* process output layer (note input layer just fans out) */
    if (debug_flag != 0) printf("Processing output layer ");
    for (i=0; i<OUTPUT_MAX; i++) {
        output_values[i] = 0.0;
        /* Handle all middle layer values including unitary input */
        for (j=0; j<=MIDDLE_MAX; j++) {
            output_values [i] =output_values [i] +output_weights [i] [j] *middle_values [j];
        } /* endfor */
        /* Note - no non-linear function on output */
    } /* endfor */
    return (output_values [0]);
}
```

---

What is claimed is:

1. A method of training a neural network to evaluate cached datasets, where dataset accesses are logged as dataset entries of a dataset access log, the method comprising:

designating multiple predetermined event triggers, each trigger comprising a predetermined event occurring in association with any one of the datasets contained in the cache;

in response to the occurrence of an event trigger, the event trigger occurring at a trigger time and in association with a first dataset represented in the dataset access log, consulting the dataset access log to identify a latest access time of the first dataset;

establishing one or more training times in an interval from the trigger time to the latest access time;

for each training time, storing selected training input including characteristics of the first dataset in a training record, the characteristics having been exhibited by the first dataset at the training time and also storing training output including a representation of value provided by having the first dataset present in the cache to satisfy future requests for access to the first dataset; and according to a predetermined schedule, providing the training input from the training record as input to a single output back propagation neural network yielding a neural network output, and training the neural network according to any difference between the training output and the neural network output.

2. The method of claim 1, wherein:

the method further includes establishing predefined expiration criteria for dataset entries represented in the dataset access log and removing dataset entries meeting the expiration criteria from the log; and the predetermined event triggers include removal of a dataset entry from the log and access of a cached dataset.

3. The method of claim 2, the predefined expiration criteria comprising presence of a dataset entry in the dataset access log for a predetermined time without that dataset being accessed.

4. The method of claim 3, in the case of event triggers caused by access of the cached dataset, the training output comprising a ratio between (1) the predetermined time reduced by an amount of time between the training time and the trigger time and (2) the predetermined time.

5. The method of claim 1, the establishing of one or more training times in an interval from the event trigger time to the latest access time comprising:

establishing training times at the event trigger time, the latest access time, and at one or more intermediate times satisfying a predefined criteria.

6. The method of claim 1, the characteristics including one or more of the following:
dataset size, time of last access, amount of data accessed during last access, day of week of last access, and length of time of dataset presence in the cache.

7. The method of claim 1, the method further comprising:
operating the trained neural network to determine values of having respective cached datasets present in the cache to satisfy future requests for access to the datasets and rank the cached datasets according to the determined values; and
removing one or more cached datasets having the lowest ranks from the cache.

8. The method of claim 7, the removing of one or more cached datasets having the lowest ranks from the cache comprising:
repeatedly removing a lowest ranked cached dataset from the cache and evaluating free space within the cache the until the free space satisfies a predetermined criteria.

9. The method of claim 8, the predetermined criteria comprising the existence of a predefined relationship between the free space and occupied space in the cache.

10. The method of claim 1, wherein:
the representation of value comprises a numerical score.

11. The method of claim 10, the operations further comprise utilizing the neural network at a first time to rank cached datasets relative to each other by their numerical scores.

12. The method of claim 1, wherein:
the predetermined event triggers include expiration of the dataset entry from the dataset access log and access of a cached dataset; and
the representation of value comprises a zero if said occurred event trigger was caused by expiration of a dataset entry corresponding to the first dataset from the dataset access log, and a numerical representation of an imminence of future access of the first dataset in cache if said occurred event trigger was caused by access of the first dataset in cache.

13. The method of claim 12, the operations further comprise ranking cached datasets relative to each other, comprising the following operations performed for cached dataset to be ranked:
providing characteristics exhibited by the dataset at the first time as input to the neural network;
the neural network providing an output comprising a representation of value provided by having the dataset present in the cache to satisfy future requests for access to the dataset; and
ranking cached datasets according to the representations of value.

14. A cache management method performed in a data storage system including a controller coupled to a storage, a dataset access log, and a cache, the cache storing datasets of the storage according to a use-related criteria, the dataset access log containing dataset entries representing access of datasets in the system, where contents of the log are removed according to a predefined expiration criteria, the method comprising:
in response to occurrence of an event trigger occurring at a trigger time, the event trigger comprising access of a cached dataset or expiration of the dataset's dataset access log entry, preparing training data by:
determining characteristics of the dataset at various times between the trigger time and a time of last access;
providing the determined characteristics and the corresponding times as input to train a single output back propagation neural network to provide as desired output scores each representing a desirability of maintaining the dataset in cache as of a different one of the various times; and
according to a predefined schedule, operating the trained neural network to generate scores for cached datasets and
according to a predefined schedule, reviewing the scores, identifying one or more datasets with lowest scores, and purging the identified datasets from the cache.

15. A signal-bearing medium tangibly embodying a program of machine-readable instructions executable by a digital processing apparatus to perform a method for training a neural network to rank datasets contained in a cache, where dataset accesses are logged as dataset entries of a dataset access log, the method comprising:
designating multiple predetermined event triggers, each trigger comprising a predetermined event occurring in association with any one of the datasets contained in the cache;
in response to the occurrence of an event trigger, the event trigger occurring at a trigger time and in association with a first dataset represented in the dataset access log, consulting the dataset access log to identify a latest access time of the first dataset;
establishing one or more training times in an interval from the trigger time to the latest access time;
for each training time, storing selected training input including characteristics of the first dataset in a training record, the characteristics having been exhibited by the first dataset at the training time and also storing training output including a representation of value provided by having the first dataset present in the cache to satisfy future requests for access to the first dataset; and
according to a predetermined schedule, providing the training input from the training record as input to a single output back propagation neural network yielding a neural network output, and training the neural network according to any difference between the training output and the neural network output.

16. The medium of claim 15, wherein:
the method further includes establishing predefined expiration criteria for dataset entries represented in the dataset access log and removing dataset entries meeting the expiration criteria from the log; and
the predetermined event triggers include removal of a dataset entry from the log and access of a cached dataset.

17. The medium of claim 16, the predefined expiration criteria comprising presence of a dataset entry in the dataset access log for a predetermined time without that dataset being accessed.

18. The medium of claim 17, in the case of event triggers caused by access of the cached dataset, the training output comprising a ratio between (1) the predetermined time reduced by an amount of time between the training time and the trigger time and (2) the predetermined time.

19. The medium of claim 15, the establishing of one or more training times in an interval from the event trigger time to the latest access time comprising:

establishing training times at the event trigger time, the latest access time, and at one or more intermediate times satisfying a predefined criteria.

20. The medium of claim 15, the characteristics including one or more of the following: dataset size, time of last access, amount of data accessed during last access, day of week of last access, and length of time of dataset presence in the cache.

21. The medium of claim 15, the method further comprising:

operating the trained neural network to determine values of having respective cached datasets present in the cache to satisfy future requests for access to the datasets and rank the cached datasets according to the determined values; and removing one or more cached datasets having the lowest ranks from the cache.

22. The medium of claim 21, the removing of one or more cached datasets having the lowest ranks from the cache comprising:

repeatedly removing a lowest ranked cached dataset from the cache and evaluating free space within the cache the until the free space satisfies a predetermined criteria.

23. The medium of claim 22, the predetermined criteria comprising the existence of a predefined relationship between the free space and occupied space in the cache.

24. A signal-bearing medium tangibly embodying a program of machine-readable instructions executable by a digital processing apparatus to perform a method for cache management method performed in a data storage system including a controller coupled to a storage, a dataset access log, and a cache, the cache storing datasets of the storage according to a use-related criteria, the dataset access log containing dataset entries representing access of datasets in the system, where contents of the log are removed according to a predefined expiration criteria, the method comprising:

in response to occurrence of an event trigger occurring at a trigger time, the event trigger comprising access of a cached dataset or expiration of the dataset's dataset access log entry, preparing training data by:

determining characteristics of the dataset at various times between the trigger time and a time of last access;

providing the determined characteristics and the corresponding times as input to train a single output back propagation neural network to provide as desired output scores each representing a desirability of maintaining the dataset in cache as of a different one of the various times; and according to a predefined schedule, operating the trained neural network to generate scores for cached datasets and according to a predefined schedule, reviewing the scores, identifying one or more datasets with lowest scores, and purging the identified datasets from the cache.

25. A data storage system, comprising:

a cache;

a data storage;

a dataset access log maintaining entries representing accesses of cached datasets; and a cache management engine linked to the data storage, the cache, and the dataset access log, the cache management engine including a single output back propagation neural network, the cache management engine being programmed to perform a method to train the neural network to evaluate cached datasets, the method comprising:

designating multiple predetermined event triggers, each trigger comprising a predetermined event occurring in association with any one of the datasets contained in the cache;

in response to the occurrence of an event trigger, the event trigger occurring at a trigger time and in association with a first dataset represented in the dataset access log, consulting the dataset access log to identify a latest access time of the first dataset;

establishing one or more training times in an interval from the trigger time to the latest access time;

for each training time, storing selected training input including characteristics of the first dataset in a training record, the characteristics having been exhibited by the first dataset at the training time and also storing training output including a representation of value provided by having the first dataset present in the cache to satisfy future requests for access to the first dataset; and according to a predetermined schedule, providing the training input from the training record as input to a single output back propagation neural network yielding a neural network output, and training the neural network according to any difference between the training output and the neural network output.

26. The system of claim 25, wherein:

the method further includes establishing predefined expiration criteria for dataset entries represented in the dataset access log and removing dataset entries meeting the expiration criteria from the log; and the predetermined event triggers include removal of a dataset entry from the log and access of a cached dataset.

27. The system of claim 26, the predefined expiration criteria comprising presence of a dataset entry in the dataset access log for a predetermined time without that dataset being accessed.

28. The system of claim 27, in the case of event triggers caused by access of the cached dataset, the training output comprising a ratio between (1) the predetermined time reduced by an amount of time between the training time and the trigger time and (2) the predetermined time.

29. The system of claim 25, the establishing of one or more training times in an interval from the event trigger time to the latest access time comprising:

establishing training times at the event trigger time, the latest access time, and at one or more intermediate times satisfying a predefined criteria.

30. The system of claim 25, the characteristic s including one or more of the following: dataset size, time of last access, amount of data accessed during last access, day of week of last access, and length of time of dataset presence in the cache.

31. The system of claim 25, the method further comprising:

operating the trained neural network to determine values of having respective cached datasets present in the cache to satisfy future requests for access to the datasets and rank the cached datasets according to the determined values; and removing one or more cached datasets having the lowest ranks from the cache.

32. The system of claim 31, the removing of one or more cached datasets having the lowest ranks from the cache comprising:

repeatedly removing a lowest ranked cached dataset from the cache and evaluating free space within the cache the until the free space satisfies a predetermined criteria.

33. The system of claim 32, the predetermined criteria comprising the existence of a predefined relationship between the free space and occupied space in the cache.

34. A data storage system, comprising:

a data storage;

a cache storing datasets of the storage according to a use-related criteria;

a dataset access log maintaining entries representing accesses of datasets contained in the cache, where contents of the log are removed according to a predefined expiration criteria; and a cache management engine linked to the data storage and the cache, the cache management engine including a single output back propagation neural network, the cache management engine being programmed to perform a cache management method comprising:

in response to occurrence of an event trigger occurring at a trigger time, the event trigger comprising access of a cached dataset or expiration of the dataset's dataset access log entry, preparing training data by:

determining characteristics of the dataset at various times between the trigger time and a time of last access;

providing the determined characteristics and the corresponding times as input to train a single output back propagation neural network to provide as desired output scores each representing a desirability of maintaining the dataset in cache as of a different one of the various times; and according to a predefined schedule, operating the trained neural network to generate scores for cached datasets; and according to a predefined schedule, reviewing the scores, identifying one or more datasets with lowest scores, and purging the identified datasets from the cache.

35. A data storage system, comprising:

first means for storing machine readable digital data;

second means for caching data of the first means;

a dataset access log maintaining entries representing accesses of cached datasets; and third means linked to the first and second means, for training a single output back propagation neural network to evaluate datasets contained in the second means by:

designating multiple predetermined event triggers, each trigger comprising a predetermined event occurring in association with any one of the datasets contained in the second means;

in response to the occurrence of an event trigger, the event trigger occurring at a trigger time and in association with a first dataset represented in the dataset access log, consulting the dataset access log to identify a latest access time of the first dataset;

establishing one or more training times in an interval from the trigger time to the latest access time;

for each training time, storing selected training input including characteristics of the first dataset in a training record, the characteristics having been exhibited by the first dataset at the training time and also storing training output including a representation of value provided by having the first dataset present in the second means to satisfy future requests for access to the first dataset; and according to a predetermined schedule, providing the training input from the training record as input to the single output back propagation neural network yielding a neural network output, and training the neural network according to any difference between the training output and the neural network output.

36. A data storage system, comprising:

first means for storing machine readable digital data;

second means for caching datasets of the first means according to a use-related criteria;

a dataset access log maintaining entries representing accesses of datasets contained in the second means, where contents of the log are removed according to a predefined expiration criteria; and third means linked to the first and second means, for managing the second means by:

in response to occurrence of an event trigger occurring at a trigger time, the event trigger comprising access of a dataset contained in the second means or expiration of the dataset's dataset access log entry, preparing training data by:

determining characteristics of the dataset at various times between the trigger time and a time of last access;

providing the determined characteristics and the corresponding times as input to train a single output back propagation neural network to provide as desired output scores each representing a desirability of maintaining the dataset in the second means as of a different one of the various times; and according to a predefined schedule, operating the trained neural network to generate scores for datasets contained in the second means; and according to a predefined schedule, reviewing the scores, identifying one or more datasets with lowest scores, and purging the identified datasets from the second means.

37. A method of grooming datasets contained in a cache, comprising:

logging accesses to cached datasets as entries in a cache access log, the entries expiring with prescribed age;

detecting occurrence of prescribed events of the following types: access of a cached dataset and expiration of a most recent cache access log entry corresponding to the dataset;

responsive to occurrence of each event, selecting various past times, and for each past time quantifying the desirability of maintaining the cached dataset in cache at that past time in view of the occurrence of the event, and training a neural network utilizing prescribed characteristics of the cached dataset as input and the quantification as a target output for each past time;

according to a predetermined schedule, evaluating cached datasets by utilizing the neural network to quantify desirability of maintaining the cached datasets in the cache; and grooming the cache by purging datasets with least desirability of maintaining them in the cache.

* * * * *

UNITED STATES PATENT AND TRADEMARK OFFICE
CERTIFICATE OF CORRECTION

PATENT NO. : 6,163,773

DATED : December 19, 2000

INVENTOR(S) : Kishi

It is certified that error appears in the above-identified patent and that said Letters Patent is hereby corrected as shown below:

IN THE DRAWINGS:

In FIGURE 2 change "STORGE" to - -STORAGE- -.

Column 3, Line 51, change "is a" to - -is an- -.

Column 3, Line 53, change "is a" to - -is an- -.

Column 3, Line 55, change "is a" to - -is an- -.

Column 5, Line 59, change "in a any digital" to - -in any digital- -.

Column 10, Line 11, change "square" to - -squares-

UNITED STATES PATENT AND TRADEMARK OFFICE
CERTIFICATE OF CORRECTION

PATENT NO. : 6,163,773

DATED : December 19, 2000

INVENTOR(S) : Kishi

It is certified that error appears in the above-identified patent and that said Letters Patent is hereby corrected as shown below:

Column 12, Line 4, change "05" to - -105- -.

In Appendix A, Line 31, change "layer" to - -layer\n- -

Signed and Sealed this

Eighth Day of May, 2001

Attest:

NICHOLAS P. GODICI

*Attesting Officer*   Acting Director of the United States Patent and Trademark Office